United States Patent [19]

Gratzer

[11] Patent Number: 5,348,253
[45] Date of Patent: Sep. 20, 1994

[54] BLENDED WINGLET

[76] Inventor: Louis B. Gratzer, 2201 3rd Ave. #2004, Seattle, Wash. 98121

[21] Appl. No.: 11,770

[22] Filed: Feb. 1, 1993

[51] Int. Cl.$^5$ .............................................. B64C 5/08
[52] U.S. Cl. ...................................... 244/91; 244/199
[58] Field of Search ................................. 244/199, 91

[56] References Cited

U.S. PATENT DOCUMENTS

| | | | |
|---|---|---|---|
| 4,205,810 | 6/1980 | Ishimitsa | 244/199 |
| 4,240,597 | 12/1980 | Ellis et al. | 244/199 |
| 4,245,804 | 1/1981 | Ishimitsa et al. | 244/91 |
| 5,102,068 | 4/1992 | Gratzer | 244/199 |

*Primary Examiner*—Galen L. Barefoot

[57] ABSTRACT

The blended winglet is a wing-like device comprising a blended lifting surface attachable to each airplane wing tip so as to achieve minimum induced drag for a given surface size. The device consists of a nearly planar, straight section joined to the wing tip through a curved transition section designed to obtain an optimum aerodynamic loading. Surface streamwise cross sections are airfoils having appropriate thickness, camber and twist variations. In a critical departure from the usual winglet design approach, the sensitive transition section features a smoothly varying chord distribution which blends smoothly and continuously with the wing and with the adjoining straight section. In the transition section the leading edge sweep angle is limited to 65° or less and the airfoil nose camber is correspondingly increased to accommodate the high sweep. The transition section also features limited in-plane curvature (i.e., large radius) to accommodate a large chord variation and to provide a practical means of achieving optimum aerodynamic loading. It also minimizes aerodynamic interference and undesirable flow separation and compressibility effects. Specific mathematical guidelines for the selection of winglet geometry are presented as a design framework for achieving maximum drag reduction and performance improvement while maintaining favorable characteristics over a range of operating conditions.

5 Claims, 3 Drawing Sheets

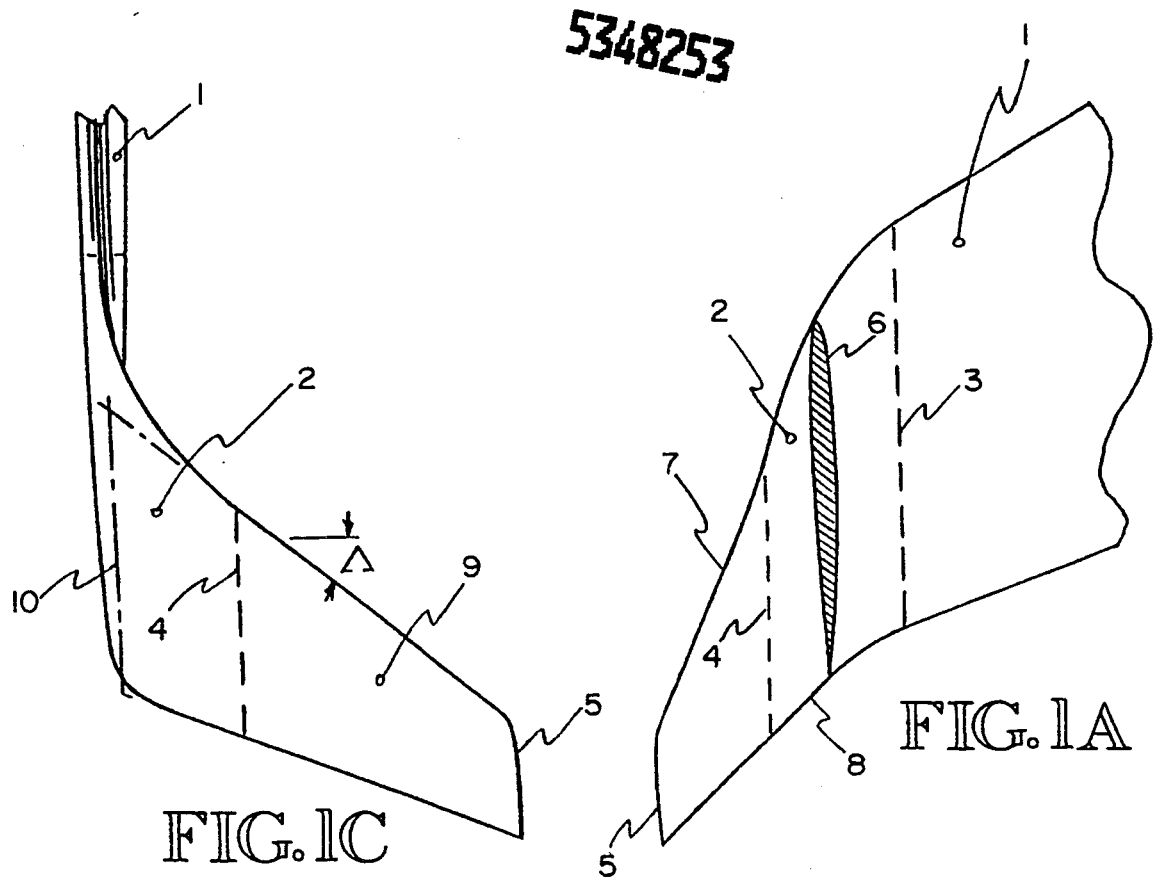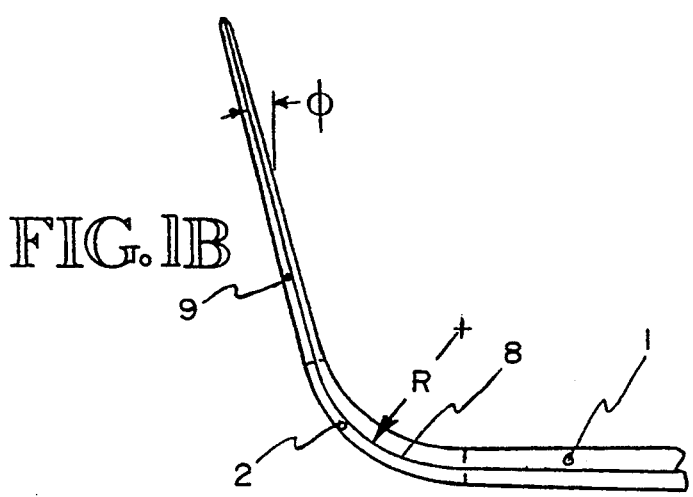

BLENDED WINGLET

BACKGROUND OF THE INVENTION

1. Field

The subject invention is in the field of lifting surfaces particularly those incorporated in aircraft or aeronautical propulsion systems. More specifically it is in the field of wing tip devices used with aircraft wings to minimize induced drag by reducing the intensity and concentration of vorticity which trails from lifting surfaces.

2. Prior Art

The patents listed below constitute a representative listing of the prior art in this field:

| U.S. Pat. No. | Date | Inventor |
| --- | --- | --- |
| 2,576,981 | 12/1951 | R. Vogt |
| 4,714,215 | 12/1981 | Jeffrey A. Judd et al |
| 4,245,804 | 1/1981 | Ishimitsu et al |
| 4,205,810 | 6/1980 | Ishimitsu |
| 3,845,918 | 11/1974 | White, Jr. |
| 4,050,397 | 9/1977 | Vanderleest |

The drag of an aircraft wing arises from a number of sources of which that associated with the trailing vortex system is a major portion—approaching one-half the total drag for a subsonic airplane in optimum cruise flight. It has long been recognized that this so-called induced drag is directly associated with wing lift and load variation along the wing span. This condition corresponds to a flow whose primary manifestation is a vorticity sheet shed downstream of the wing trailing edge (i.e., the trailing vortex system) that is very intense near the wing tip. The induced drag depends on the following parameters in a manner conveniently expressed as follows:

$$\text{Induced Drag} = K_i (\text{lift})^2 / \pi q (\text{span})^2$$

where q is dynamic pressure $= \frac{1}{2}\rho V^2$ $\rho$ is air density

V is flight velocity also, $K_i$ is the induced drag factor

The induced drag factor, $K_i$ depends on the spanwise load distribution and the configuration of the lifting system. For a planar wing, the elliptic loading is optimum and $K_i = 1.0$. However, it is also known that the minimum induced drag is less ($K_i < 1.0$) for configurations with increased ratios of total trailing edge length to span. Examples include monoplanes with tip winglets or end-plates, multiplanes of various types (e.g., biplane, triplane) and various forms of arched lifting surfaces, either open or closed. Also, assorted tip devices involving the use of multiple surfaces have been proposed for application to monoplanes or multiplanes. Many of the above are not particularly efficient or useful for various reasons including excessive structural weight, high loads, concomitant drag sources and operational limitations. Thus, with the exception of the monoplane with winglets, they find little use today. Several forms of winglets are currently in use for applications where span and operational space may be limited or where existing airplane configurations can otherwise benefit from their use. However it has not been generally established that winglets are preferable to or more efficient than simple wing span extensions to reduce induced drag. In many cases their relative benefit is marginal or even cosmetic. Winglets today are almost invariably attached to the wing tip in a way that results in relatively sharp corners and rapid changes in chord at their intersection, such as shown in the cited patents to Ishimitsu et al. This lack of a smooth, gradual transition results in significant departures from the optimum loading and the shedding of concentrated vorticity at the intersections. Thus the anticipated benefit of the winglet will not meet performance expectations and other adverse effects (e.g., premature stall, buffet) can result.

The object of the present invention is to provide a winglet configuration concept which includes an efficient transition between the wing and the winglet which maintains near-optimum loading over a substantial range of operating conditions thereby achieving the full drag reduction potential of the wing tip device. This blending between wing and winglet (hence, the title "blended winglet") is accomplished in a way which observes recognized structural and geometric limitations while maintaining favorable performance and operational characteristics.

SUMMARY OF INVENTION

The subject invention is a winglike aerodynamic device for installation on the tip of a lifting wing comprising a contoured surface, which itself carries lift, blending continuously and smoothly with the wing geometry to form a continuation of the wing and projecting vertically either up or down from the wing plane and laterally from its tip. For a fixed-wing aircraft such devices would be installed on each side with right and left hand configurations on corresponding tips. FIGS. 1A (plan view) 1B (rear view) and 1C (side view) illustrate the essential features of such a device configured to yield minimum induced drag for a given arrangement of wing and winglet of specified size and total lift. The lateral and vertical dimensions of the blended winglet may have any values consistent with the overall design objectives and practical considerations which may limit the winglet size and form. The winglet, having a chord at the attachment to the wing equal to the wing tip chord, incorporates a chord variation specifically defined to maintain a continuous and smooth variation of load in the area of transition between the wing tip and the outer, usually planar portion of the winglet. The winglet cross sections throughout are airfoils of specified thickness, camber and twist (See FIG. 1A). This results in a contoured surface so shaped as to provide the optimum distribution of load thereon. In combination with the appropriate wing lift distribution, this will yield minimum induced drag for a given total lift and overall span of the wing and winglet combination.

The basic function of the winglet configured in this way is described here with reference to FIGS. 2, 3 and 4. FIG. 2 shows a typical wing operating at velocity V and angle-of-attack $\alpha$ of a reference airfoil section A. The lift is distributed along the wing in essentially elliptic fashion as designated by curve E. Also, the vorticity in the wake W, typical elements of which are designated by T, leaves the wing from its trailing edge in alignment with the local stream direction. The vorticity wake is represented by a continuous sheet in which intensity varies in proportion to the spanwise rate of change of lift; thus, there is a high concentration of vorticity near the wing tip. At some distance downstream the vorticity sheet rolls up as illustrated at wake section S. This finally leads to the formation of two concentrated vortices X downstream. The elliptic loading and the corresponding wake vorticity pattern result in minimum induced drag for a planar monoplane.

FIG. 3 shows an oblique view of a typical wing with conventional winglets installed. The trailing vorticity sheet W is now spread over a larger trailing edge distance thus exploiting the principle stated in the previous section. However, in addition to the unavoidable concentration of vorticity at the winglet tip, the sudden chord change at the wing tip attachment results in unwanted concentration of vorticity which does not correspond to the conditions for optimum loading, especially in this area. The resulting pattern of vorticity thus produces higher energy levels in the wake flow leading to higher drag. It is important to note that even if the wing to winglet chord variation is continuous in the transition region, the usual sharp angular transition between wing and winglet precludes the practical realization of optimum loading in this area thereby producing intense vorticity concentrations which cause higher drag.

FIG. 4 illustrates a blended winglet which features two important characteristics generally absent from conventional winglet designs. The first, as previously noted, is a continuous, monotonic variation of winglet chord in the transition area. For purposes of this disclosure, the term monatonic (derived from the word monotonous) means that relevant changes occur in a gradual manner such that rates of change are minimal in the direction of change. This is specifically selected to avoid excessive leading edge sweep which invariably leads to leading edge flow separation and drag-producing vortices. The second is a continuous, monotonic variation of cant angle $\phi$ corresponding to a radius of curvature which is nearly constant. This is done primarily to achieve compatibility with the chord variation and to avoid an extreme variation in loading for the optimum condition. The latter situation occurs when the radius is too small thereby making it practically impossible to achieve minimum drag by appropriate surface design. Additional benefits such as reduced tendency to flow separation and reduced interference drag, especially at high Mach number are significant. The above features make it possible to select the remaining geometric variables so as to provide optimum loading for a given winglet size and overall lift, while avoiding the concentrations of vorticity in the transition area that cause excessive drag. In all cases the winglet camber and twist distributions are selected to provide the optimum loading for the wing/winglet combination while maintaining favorable profile drag and high Mach number characteristics. To summarize briefly, the underlying principle of the subject invention is to effect the transition from wing to winglet with parameter variations having rates of change as low as possible within the dimensional constraints of wing and winglet. These parameters include: 1) leading edge curvature and chord rate of change, 2) leading edge sweep with matching airfoil section nose camber and 3) radius of the defining surface generator (e.g., the trailing edge) in the transition area.

The subject invention is described in more detail with reference to the attached drawings.

BRIEF DESCRIPTION OF DRAWINGS

FIG. 1A is a plan view of the left end of a wing with blended winglet installed.

FIG. 1B is a rear view of the wing/winglet combination shown in FIG. 1A.

FIG. 1C is a left hand side view of the wing/winglet combination shown in FIG. 1A.

DETAILED DESCRIPTION OF INVENTION

Figure 2:
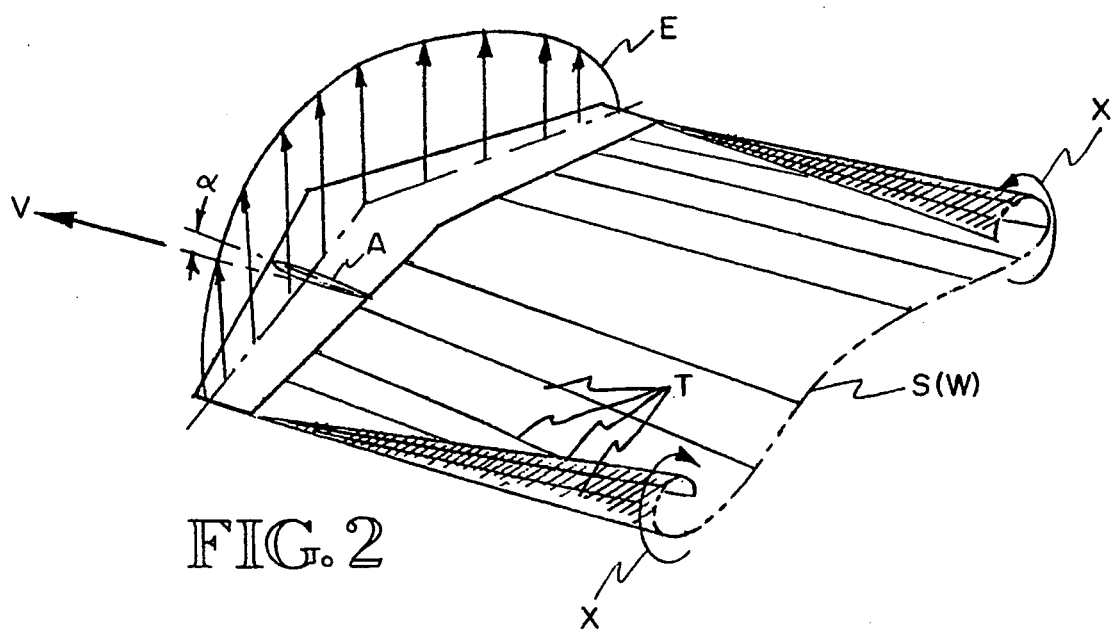
FIG. 2 is an oblique view of a monoplane wing showing a typical load distribution and the corresponding trailing wake structure.
Figure 3:
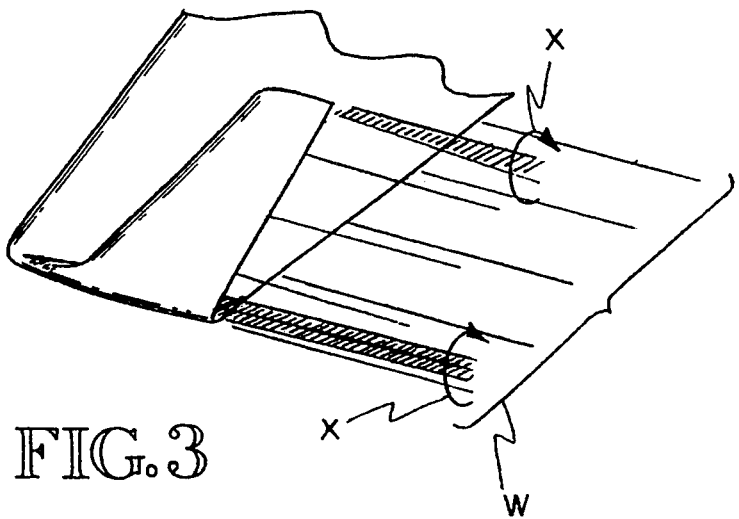
FIG. 3 is an oblique view of a portion of a wing with conventional winglets installed which shows the trailing wake structure usually found with this arrangement.
Figure 4:
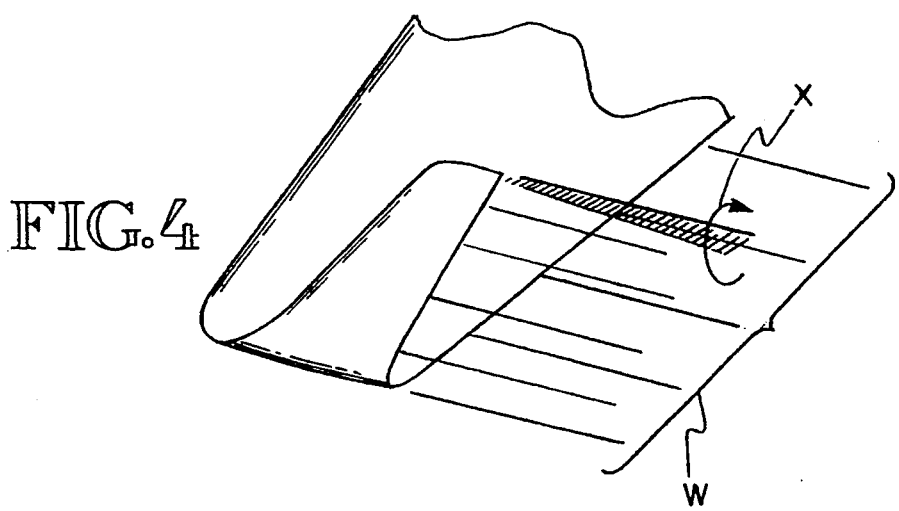
FIG. 4 is an oblique view of a portion of a wing with blended winglets installed showing the more favorable wake structure corresponding to optimum loading.

As shown in the drawings, I have chosen to illustrate the essential features of the invention using a typical blended winglet arrangement. FIGS. 1A, 1B, and 1C show a typical wing end portion 1 with a blended winglet, comprising two main sections, attached thereto. The winglet chord equals the wing tip chord at the attachment line 3. A transition section 2 is bounded by the attachment line 3 and a chordwise line 4 designating the transition end on the winglet. The nearly planar outer portion of the winglet 9 is generally straight from the transition end 4 to the tip 5 having a chord, $C_5$. The winglet cross sections are airfoils 6 having appropriate thickness, camber and twist variations to produce the optimum winglet load variation which is necessary for minimum induced drag of the wing and winglet combination. The transition section 2 has several important characteristics which are essential to the proper function of the winglet.

The first feature is a continuous monotonic chord variation bounded by the leading edge curve 7 and trailing edge curve 8. These curves are tangent to the wing leading edge and trailing edge respectively at the winglet attachment line 3 and also tangent to the leading edge and trailing edges respectively of the straight section 9 at line 4. The leading edge curve 7 is selected to provide a smooth gradual chord variation in the transition and also, to limit the leading edge sweep angle to less than about 65°. This is necessary to avoid vortex shedding from the leading edge which would compromise the surface loading and thereby increase drag. The shape of the trailing edge curve 8 is generally not critical but is selected to correspond to the airfoil chord and twist required to achieve the optimum loading. This restriction will usually allow the wing and winglet trailing edges to lie in the same plane which is desirable functionally and aesthetically.

The second feature is a continuous monotonic variation of cant angle, $\phi$ (see FIG. 1B). The radius of curvature, R must be large enough to accommodate the chord variation in the transition section and to allow the practical achievement of optimum aerodynamic loading and minimum interference between wing and winglet. The radius of curvature criteria is given as follows in terms of a parameter, $K_R$ having fairly narrow limits:

$$\frac{R}{h} = K_R \cos\left(\frac{\phi_4}{2} + \frac{\pi}{4}\right)/\cos\phi_4; \; .35 < K_R < .50$$

where,
- h = winglet height measured along a normal to the wing chord plane
- $\phi_4$ = cant angle of the planar section
- $\Lambda_H$ = maximum sweep angle of the leading edge curve 7
- $K_R$ = curvature parameter (select lower limit if practical)

While leading edge sweep $\Lambda_H$ may be allowed to approach a value of 65° in the transition area, this is only permissible if accompanied by an appropriate variation of airfoil nose camber. This consists of an increment, $\eta$ from the basic airfoil camber line given approximately as follows:

$$\eta = \eta_0(1-\xi/\xi_T)^2 \quad 0 \leq \xi \leq \xi_T$$

where
- $\eta_0$ = camber line increment at the airfoil nose ($\xi = 0$)
- $\xi_T$ = chordwise extent of camber line increment.

The appropriate relationship between $\eta_0$, $\eta_T$ and leading edge sweep angle is given by:

$$\eta_0 \approx 0.1 \xi_T \approx 0.006 \tan^{1.3} \Lambda$$

Figure 5:
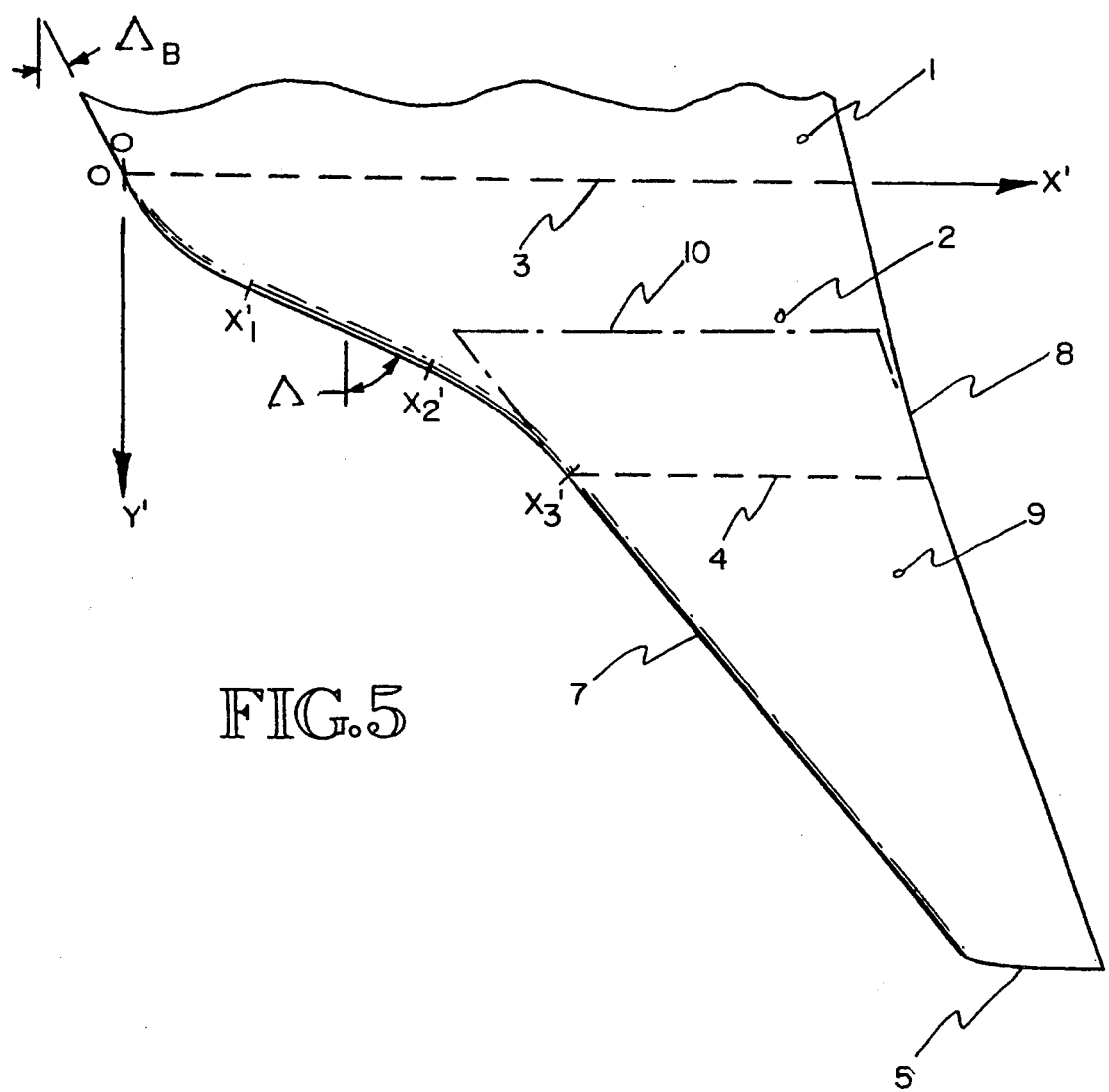
FIG. 5 is a developed view of the blended winglet wherein the winglet surface is laid out flat on the x-y plane.

The above features are best illustrated by reference to FIG. 5 which shows a developed view of the blended winglet; i.e., the winglet surface unfolded to lie essentially in the wing plane. For present purposes (and referring to FIG. 1C), the winglet can be characterized by an extension of the near-planar section 9 (alternately referred to as the straight section) down to the wing chord plane thereby creating a virtual winglet root 10 with chord $c_{10}$. This is used to define the winglet area $S_W$ and taper ratio $\lambda_W$ as follows:

$$\lambda_W = \frac{\text{tipchord}}{\text{root chord}} = \frac{c_5}{c_{10}}$$

and $$S_W = \frac{1}{2}(c_5 + c_{10})\frac{h}{\cos \phi_4}$$

where h is the height of the winglet measured along a normal to the wing chord plane to the winglet tip 5 with chord $c_5$. The winglet area is also delineated by the dash-dot line in FIG. 5. It is emphasized that the main geometric parameters of the winglet will be selected to facilitate achieving the optimum performance including:

1. A height and cant angle limited by the winglet-induced bending moment and the structural capability of the wing.
2. A minimal winglet area based on the optimum ratio of winglet lift to wing lift and the highest practical winglet lift coefficient, $(C_L)_W$ where, $0.6 < (C_L)_W < 0.7$. This relationship is defined by the following equation:

$$\frac{S_W}{S} = K_S(1 - K_\phi \cos\phi_4)/\cos^{1.3}\phi_4 \left(\frac{2h}{b}\right)^{1.3} \frac{C_L}{(C_L)_W} \text{Design}$$

where, $.35 < K_S < .40; .15 < K_\phi < .20$

3. A winglet taper ratio which best accommodates the optimum aerodynamic loading on the winglet. This is based on the criteria:

$$\lambda_4 = K_\lambda \left(\frac{2h}{b}\right)^{.2}; .45 < K_\lambda < .55$$

A winglet position well aft on the wing tip is also desired in order to minimize aerodynamic interference, especially at high speed.

4. A combination of sweep $\Lambda_W$ and thickness $(t/c)_W$ designed to provide a winglet speed margin at the design operating condition corresponding to:

$$(M_{CRIT})_{winglet} \approx (M_{CRIT})_{wing} + 0.01$$

Given these characteristics a suitable choice of leading edge curve for the transition section is conveniently specified in three segments as follows:

SEGMENT 1 ($0 < x' < x_1'$)

$$x' = A_1 y' + B_1 y'^2; A_1 = \tan\Lambda_B$$

SEGMENT 2 ($x_1' = x' < x_2'$)

$$x' = A_2 + B_2 y'; B_2 = \tan\Lambda_N$$

SEGMENT 3 ($x_2' < x' < x_3'$)

$$x' = A_3 + B_3 y' + C_3 y'^2$$

The coefficients in the above equations are determined by the requirement for continuity and tangency between adjacent segments, which also include the leading edges of the wing 1 and the winglet straight section 9.

Finally, it is pointed out that the stated approach for transition geometry definition can, in unusual cases, lead to leading edge sweep angles exceeding the defined limits or to planforms with unacceptably sharp variations in chord. In such situations, moving the leading edge of the planar section forward or adjusting its sweep $\Lambda_4$ may avoid these characteristics. These adjustments may be accompanied by a moderate movement of the trailing edge forward or increase in transition radius while maintaining consistency with other requirements. This approach need not introduce significant performance penalties and may even be beneficial.

It will be noted that the above discussion is in relation to the left-hand wing tip for a fixed-wing airplane. Thus, it should be apparent that a complete airplane installation will include devices of opposite hand on the right-hand wing tip. Furthermore, although the focus has been on a single element winglet, there may also be wing tip devices which include several lifting elements. The principles outlined above for the single winglet are equally applicable to multi-element devices and should be applied in a similar manner.

With transition curves (y vs z) and (y' vs x') in the developed view (FIG. 5) established, the leading edge space curve is readily determined since $$y' = \int_0^z \sqrt{1 + (dy/dz)^2}\, dz$$

and

-continued $$x' = x.$$

The definition of the winglet trailing edge space curve can then be completed using the chord, twist and camber variations previously found to produce the prescribed loading on the winglet. At this point it should be recognized that adjustments to both leading edge and trailing edge, as they appear in the y-z plane, can be made so long as the airfoil twist and camber relationships are not changed. Since the trailing edge is most prominent, its appearance is usually enhanced if the trailing edges of the wing 1 and the winglet straight section 9 are straight lines with the transition section trailing edge being a regular monotonic curve (e.g., constant radius).

The above describes the preferred approach to winglet geometry definition in order to realize the greatest drag reduction. However, there may be situations where a winglet base chord more nearly matching the wing tip chord is desired. In such cases, leading edge sweep limitations may not apply so that more freedom in selecting the winglet leading edge shape is allowed. However it will still be necessary to incorporate a transition segment featuring a radius of curvature corresponding to the given criteria in order to reduce aerodynamic interference and avoid adverse compressibility effects as well to achieve the optimum aerodynamic loading.

It is considered understandable from this disclosure that the blended winglet is ideally suited to meet the objectives of the subject invention. This has been demonstrated by comparative drag data obtained in flight. The blended winglet incorporates a transition section having small curvature (i.e., large radius) and a controlled chord variation that blends smoothly into a near-planar section. The airfoil shape variation in the transition section also incorporates a nose camber distribution matching a varying leading edge sweep angle which is limited to 65° in order to avoid vortex shedding. Because of these features, which are not included in current winglet designs, the blended winglet permits an ideal aerodynamic loading. This reduces wake intensity, thereby producing minimum induced drag. The adverse effects of premature drag-rise, buffet and flow separation are also largely avoided. The blended winglet is adaptable to use in most any apparatus or machine which employs lifting surfaces. Therefore it can profitably be applied to helicopters, propeller blades, fans and similar devices.

I claim:

1. A blended wiglet attachable to a tip of a wing; said wing having an upper and a lower surface, a leading edge and a trailing edge; said wing leading edge and trailing edge being the fore and aft intersections of said upper and lower surfaces; said blended winglet comprising a curved transition section and a near-planar section contiguous with said transition section; said near-planar section having a cant angle measured from the normal to said wing and prescribed within limits to provide a desired drag reduction for minimal structural weight; said winglet projecting at an angle to the wing plane and having an upper surface and a lower surface, a leading edge and a trailing edge; said winglet leading edge and trailing edge being the fore and aft intersections of said upper and lower surfaces of said winglet; said wing and winglet upper and lower surfaces defining a solid having streamwise cross sections of airfoil shape; said airfoils having thickness camber and twist variations to provide optimum aerodynamic loading of said surfaces; said winglet leading edge and trailing edge having a varying streamwise spacing and varying monotonically within prescribed limits whereby the formation of vortices and areas of flow separation are prevented; said winglet transition section having prescribed curvature limits whereby practical achievement of surface aerodynamic loadings required for minimum drag are permitted.

2. The winglet of claim 1 wherein said transition section has a radius of curvature R of the principle spanwise generator which meets the criteria:

$$\frac{R}{h} = K_R \cos\left(\frac{\phi_4}{2} + \frac{\pi}{4}\right)/\cos \phi_4; .35 < K_R < .50;$$

and the airfoil geometry of said transition section is constrained by the following relationships between leading edge sweep angle $\Lambda$ airfoil nose camber $\eta_o$ and nose camber chordwise extent $\xi_T$.

$$\eta_o \cong 0.1 \ \xi_T \cong .006 \tan^{1.3}\Lambda$$

where said sweep angle $\Lambda$ may not exceed approximately 65°.

3. The winglet of claim 2 wherein said near-planar section having a taper ratio $\lambda_4$ is oriented at a cant angle $\phi_4$ to the wing normal where said cant angle lies between the limits:

$$0° < \phi_4 < 40° \text{ and } 140° < \phi_4 < 180°$$

and said taper ratio satisfies the relations:

$$\lambda_4 = K_\lambda \left(\frac{2h}{b}\right)^{.2} ; .45 < K_\lambda < .55.$$

4. The winglet of claim 3 having a minimum surface area $S_w$ as prescribed by the equation:

$$\frac{S_W}{S} = K_S(1 - K_\phi \cos \phi_4)/\cos^{1.3} \phi_4 \left(\frac{2h}{b}\right)^{1.3} \frac{C_L}{(C_L)_W} \text{Design}$$

where $$.35 < K_S < .40; .15 < K_\phi < .20;$$

said winglet surface area being dependent on the airplane design lift coefficient $C_{L \ Design}$ which is given apriori and the winglet design lift coefficient $(C_L)_w$ which lies between the following limits:

$$0.6 < (C_L)_w < 0.7$$

5. The winglet of claim 4 wherein the optimally loaded aerodynamic surface is configured with a combination of sweep angle $\Lambda$ and airfoil thickness which meets the following criteria for critical Mach number $M_{crit}$ at the design operating condition:

$$(M_{crit})_{winglet} \cong (M_{crit})_{wing} + 0.01.$$

* * * * *

(12) EX PARTE REEXAMINATION CERTIFICATE (9547th)
United States Patent
Gratzer

(10) Number: US 5,348,253 C1
(45) Certificate Issued: Mar. 6, 2013

(54) BLENDED WINGLET

(75) Inventor: Louis B. Gratzer, Seattle, WA (US)

(73) Assignee: Aviation Partners, Inc., Seattle, WA (US)

Reexamination Request:
No. 90/012,045, Dec. 12, 2011

Reexamination Certificate for:
Patent No.: 5,348,253
Issued: Sep. 20, 1994
Appl. No.: 08/011,770
Filed: Feb. 1, 1993

(51) Int. Cl.
*B64C 5/08* (2006.01)
(52) U.S. Cl. ............................. 244/91; 244/199.4
(58) Field of Classification Search ............ 244/91, 244/199.4
See application file for complete search history.

(56) References Cited

To view the complete listing of prior art documents cited during the proceeding for Reexamination Control Number 90/012,045, please refer to the USPTO's public Patent Application Information Retrieval (PAIR) system under the Display References tab.

Primary Examiner — Jimmy G. Foster

(57) ABSTRACT

The blended winglet is a wing-like device comprising a blended lifting surface attachable to each airplane wing tip so as to achieve minimum induced drag for a given surface size. The device consists of a nearly planar, straight section joined to the wing tip through a curved transition section designed to obtain an optimum aerodynamic loading. Surface streamwise cross sections are airfoils having appropriate thickness, camber and twist variations. In a critical departure from the usual winglet design approach, the sensitive transition section features a smoothly varying chord distribution which blends smoothly and continuously with the wing and with the adjoining straight section. In the transition section the leading edge sweep angle is limited to 65° or less and the airfoil nose camber is correspondingly increased to accommodate the high sweep. The transition section also features limited in-plane curvature (i.e., large radius) to accommodate a large chord variation and to provide a practical means of achieving optimum aerodynamic loading. It also minimizes aerodynamic interference and undesirable flow separation and compressibility effects. Specific mathematical guidelines for the selection of winglet geometry are presented as a design framework for achieving maximum drag reduction and performance improvement while maintaining favorable characteristics over a range of operating conditions.

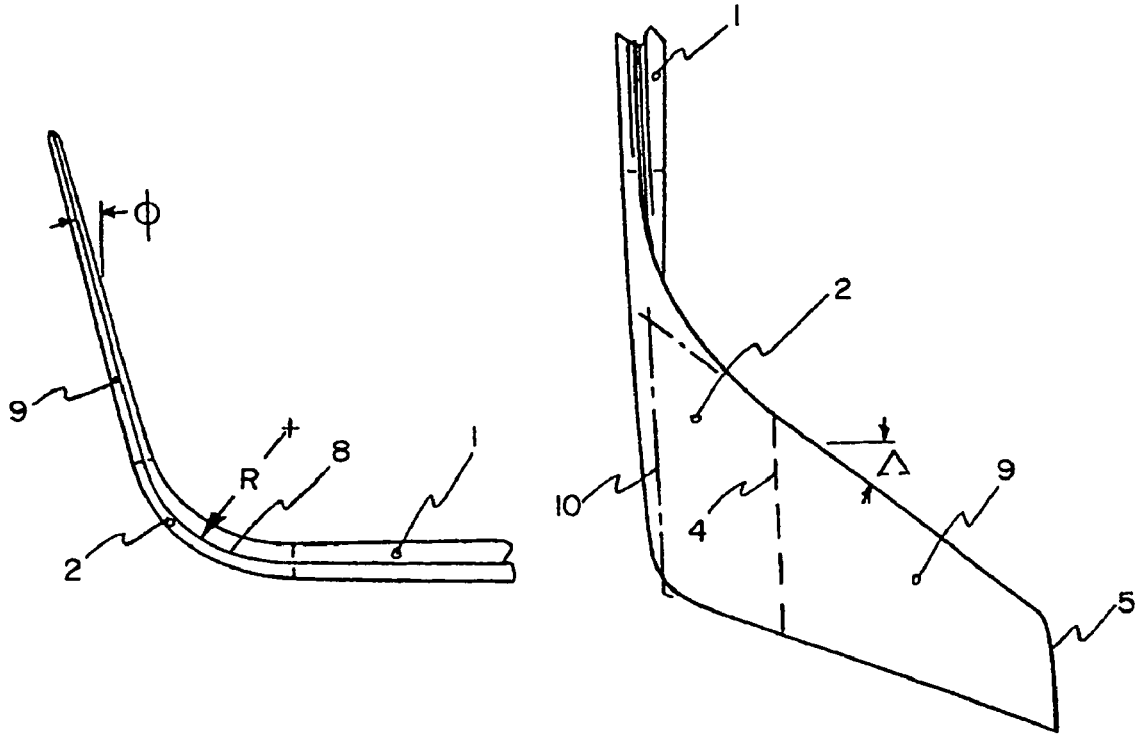

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

Claims 2-5 were not reexamined.

* * * * *